United States Patent
Ding (10) Patent No.: US 6,526,493 B1
(45) Date of Patent: Feb. 25, 2003

(54) METHOD AND APPARATUS FOR PARTITIONING AND FORMATTING A STORAGE MEDIA WITHOUT REBOOTING BY CREATING A LOGICAL DEVICE CONTROL BLOCK (DCB) ON-THE-FLY

(75) Inventor: Yafu J. Ding, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/281,596

(22) Filed: Mar. 30, 1999

(51) Int. Cl.⁷ .............................................. G06F 12/00
(52) U.S. Cl. ............................ 711/170; 711/173; 713/2
(58) Field of Search ............................... 711/153, 173, 711/170; 713/2

(56) References Cited

U.S. PATENT DOCUMENTS

| | | | |
|---|---|---|---|
| 5,269,022 A | 12/1993 | Shinjo et al. ................... 713/2 |
| 5,418,918 A | 5/1995 | Vander Kamp et al. ......... 713/2 |
| 5,430,845 A | 7/1995 | Rimmer et al. ................ 710/12 |
| 5,469,573 A | 11/1995 | McGill, III et al. ........... 717/11 |
| 5,680,556 A | 10/1997 | Begun et al. ................ 710/131 |
| 5,694,600 A | 12/1997 | Khenson et al. ................ 713/2 |
| 5,713,024 A | 1/1998 | Halladay ...................... 717/11 |
| 5,754,782 A | 5/1998 | Masada ....................... 709/213 |
| 5,787,491 A | * 7/1998 | Merkin et al. .............. 711/173 |
| 5,829,053 A | * 10/1998 | Smith et al. ................. 711/202 |
| 5,905,888 A | 5/1999 | Jones et al. ..................... 713/2 |
| 5,907,679 A | * 5/1999 | Hoang et al. ................... 713/2 |
| 5,951,685 A | 9/1999 | Stancil ........................... 713/2 |
| 5,974,517 A | * 10/1999 | Gaudet ....................... 711/173 |
| 6,012,130 A | * 1/2000 | Beyda et al. ................ 711/173 |
| 6,041,395 A | * 3/2000 | Beelitz ........................ 711/173 |
| 6,088,778 A | * 7/2000 | Ruff et al. ................... 711/173 |

* cited by examiner

*Primary Examiner*—Glenn Gossage
(74) *Attorney, Agent, or Firm*—Martine & Penilla, LLP (57) ABSTRACT

A method and computer readable media having program instructions for preparing a storage media are provided. The method includes partitioning a selected storage media into two or more partitions. Once partitioned, a kernel mode driver interface is called in order to create a logical device control block (DCB) on-the-fly for each of the two or more partitions. The method the follows to formatting each of the two or more partitions. The method includes identifying partitions that have not been previously formatted, associating the created logical DCBs with physical device control block information of the identified partitions, assigning drive letters to the identified partitions, and associating the drive letters with the physical device control block information. The drive preparation is configured to be performed without having to reboot the computer system driving the preparation after the partitioning or after the formatting. The user preparing the storage media can therefore immediately begin using and saving data to the newly prepared drive.

20 Claims, 6 Drawing Sheets

METHOD AND APPARATUS FOR PARTITIONING AND FORMATTING A STORAGE MEDIA WITHOUT REBOOTING BY CREATING A LOGICAL DEVICE CONTROL BLOCK (DCB) ON-THE-FLY

BACKGROUND OF THE INVENTION

1. Field of the Invention

This invention relates generally to computer systems, and more particularly to methods and apparatuses for more efficiently partitioning and formatting a storage media of a computer drive.

2. Description of the Related Art

In recent years, computer hardware and software companies have been designing more user friendly systems that allow users to custom configure and modify their systems in view of their particular needs. For instance, users are easily able to add host adapters which provide a computer with an increased level of expansion and customization. As the need for more storage space arises, users typically add additional storage devices (e.g., hard drives and removable drives). Although sophisticated computer users are typically familiar with many of the process steps required to prepare a new drive, a large majority of casual computer users are unaware of the importance of diligently following each step that is required to prepare a new drive.

By way of example, in a Microsoft Windows™ operating system (Microsoft Corp., Redmond Wash.) environment, if a user desires to partition the drive into several logical partitions, the user must first partition the drive and then follow-up with a formatting operation. To better describe the drive preparation process, reference is made to FIG. 1, which pictorially illustrates the steps required to complete a successful preparation. Initially, the physical drive 102 is identified by the user. The identification generally requires that the user select the correct drive to prepare from those connected to a system. Although this is a very simple step, the selection of the wrong drive could be catastrophic if important user data is forever lost. Now, the physical drive is partitioned 103 into a user selected number of logical partitions.

Figure 1:
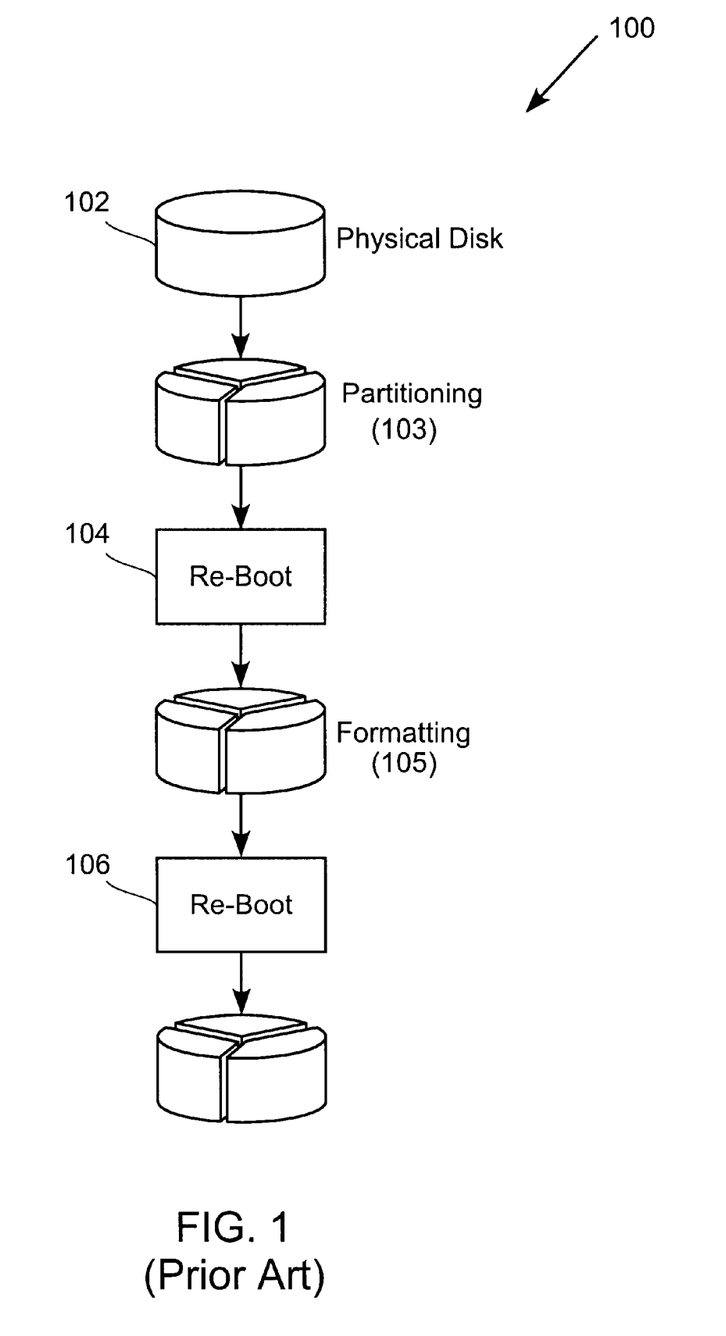
FIG. 1 pictorially illustrates the steps required to complete a successful prior art preparation, which requires two reboots during preparation.

In this example, the user selected to partition the physical drive into three partitions. Upon completing the partitioning 103, the computer must be shut down and restarted in order to reboot 104 the system. When the computer is restarted, the operating system (OS) will scan the drive and then must ascertain in what step of the preparation process it is at currently. Once it is determined that the OS is being restarted after a "first reboot," the preparation process continues to a formatting 105 operations.

However, if a casual computer user erroneously believes that the preparation has come to a successful conclusion after the first reboot, the user may mistakenly remove the drive that is currently being prepared. If this were to happen, when the computer was restarted after the first reboot, the formatting 105 may move to format the next drive that may be connected to the system. In such a case, important data and applications stored on the next drive may be irreparably lost after the formatting is performed. In some cases, if the drive being prepared is removed after shut down and before the restart of the first reboot, the system may also experience a routine error and the logic of preparing the drive will be broken.

On the other hand, assuming that the user is sophisticated enough to know that the formatting 105 follows the first reboot 104, the user would have to again reboot 106 after the formatting. During the formatting 105, the OS assigns drive letters (i.e., C:, D:, and E:) to the partitioned drive. Upon reboot 106, the application running the preparation must determine if the reboot is the first or second reboot. When it determines that it is the second reboot, the OS will scan the drive and will proceed to assign a drive control block (DCB) to each partition of the formatted drive. An application can now enable data to be stored in selected partitions of the drive.

Because the preparation of a drive requires two separate reboots, the logical sequence of partitioning followed by a formatting is broken. That is, upon restarting the computer, the application driving the preparation is required to go through more logical tests to ascertain what stage it is in before proceeding to the next stage in the drive preparation. As described above, this break in logic can cause problems if the computer's physical configuration is changed between reboots. Not only is it a confusing process for the non-sophisticated computer user, it is also time consuming. As the operating systems become more complex, the rebooting process has also been increasing from several seconds to one or more minutes. As such, busy computer users typically offload the drive preparation tasks to more sophisticated computer support personnel to avoid dealing with reboots and other possible errors.

In view of the foregoing, there is a need for a drive preparation method that eliminates the requirement to sequentially reboot the computer system.

SUMMARY OF THE INVENTION

Broadly speaking, the present invention fills these needs by providing a method and computer readable media having program instructions for preparing a storage media of a drive. The preparation method is designed to enable partitioning and formatting the storage media without having to reboot the computer system that is performing the preparation. It should be appreciated that the present invention can be implemented in numerous ways, including as a process, an apparatus, a system, a device, a method, or a computer readable medium. Several inventive embodiments of the present invention are described below.

In one embodiment, a method for preparing a storage media is disclosed. The method includes partitioning a selected storage media into two or more partitions. Once partitioned, a kernel mode driver interface is called in order to create a logical device control block for each of the two or more partitions. The method then follows to formatting each of the two or more partitions. The drive preparation is configured to be performed without having to reboot the computer system driving the preparation after the partitioning or after the formatting. The user preparing the storage media can therefore immediately begin using and saving data to the newly prepared drive.

The creating of the logical device control blocks, in this embodiment, includes scanning partition tables of the storage media and identifying partitions of the storage media that have not been previously formatted. The method then follows to associating the logical device control block with physical device control block information of the identified partitions that have not been previously formatted and then assigning a drive letter to each of the partitions. The assigned drive letters are then associated with the physical device control block information of the partitions that have not been previously formatted. The method then follows to instruct an operating system of a computer that is preparing the selected storage media to update information regarding the created logical device control blocks.

In another embodiment, a method for partitioning and formatting storage media of a hard disk drive or removable disk drive is disclosed. The method includes a plurality of operations that are each called by a drive preparation application. The operations of the method include partitioning the storage media into a plurality of partitions. The method then follows to creating a logical device control block for each of the plurality of partitions after the partitioning is complete. Once the logical device control blocks are created, the method follows to formatting each of the plurality of partitions. The partitioning and formatting are performed on-the-fly without cycling through complete reboots after the partitioning and the formatting.

In yet a further embodiment, a computer readable media having program instructions for partitioning and formatting storage media of a hard disk drive or removable disk drive is disclosed. The program instructions include a plurality of operations that are each called by a drive preparation application. The operations of the computer readable media include program instructions for partitioning the storage media into a plurality of partitions and program instructions for creating a logical device control block for each of the plurality of partitions after the partitioning is complete. The computer readable media further includes program instructions for formatting each of the plurality of partitions. The partitioning and formatting are performed on-the-fly without cycling through complete reboots after the partitioning and the formatting.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method for preparing a storage media of a drive. The preparation method is designed to enable partitioning and formatting of the storage media without having to reboot the computer system that is performing the preparation. It will be obvious, however, to one skilled in the art, that the present invention may be practiced without some or all of these specific details. In other instances, well known process operations have not been described in detail in order not to unnecessarily obscure the present invention.

Figure 2:
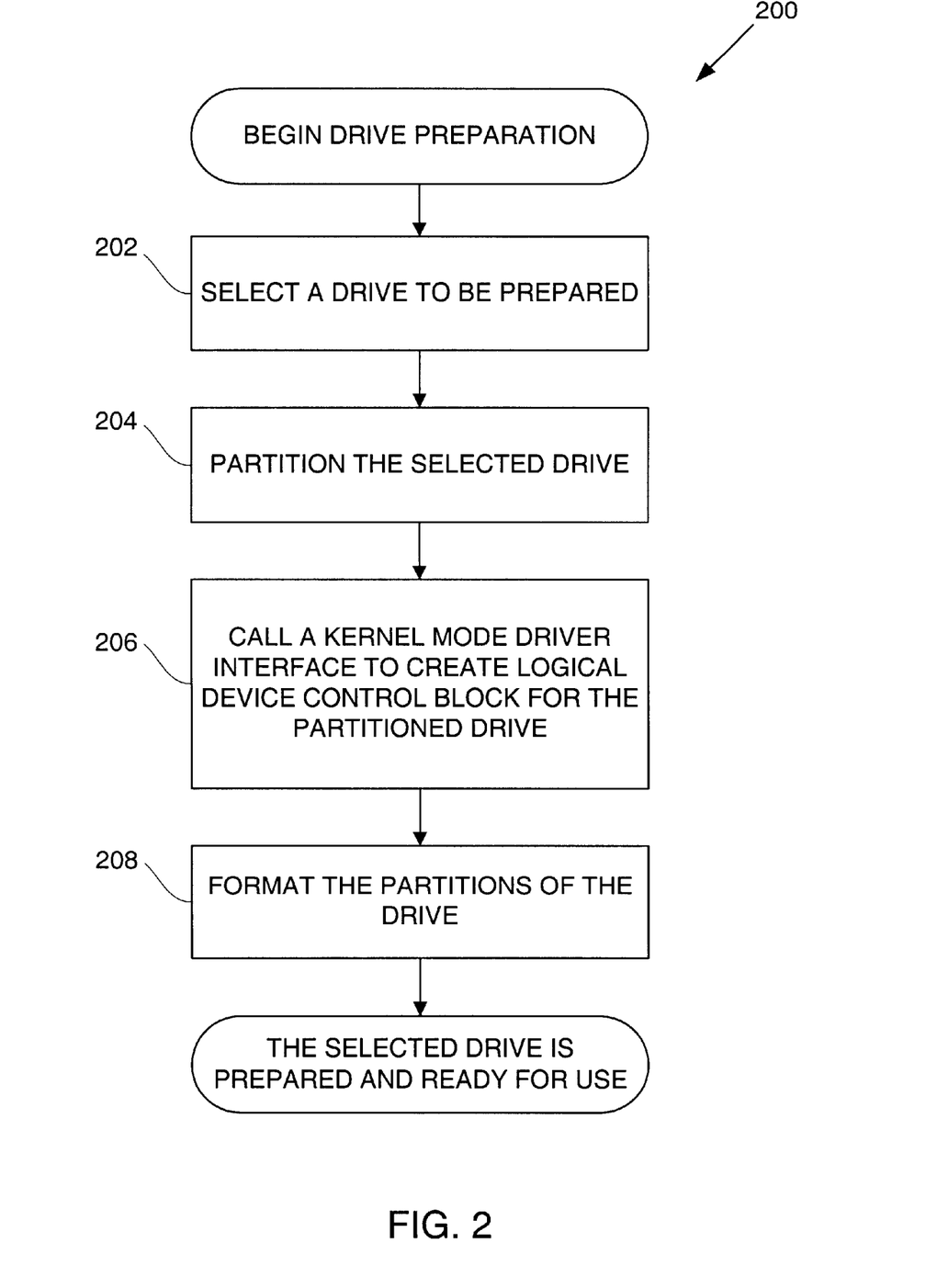
FIG. 2 illustrates a flowchart diagram of the method operations performed in preparing a drive in terms of partitioning and formatting, in accordance with one embodiment of the present invention

FIG. 2 illustrates a flowchart diagram 200 of the method operations performed in preparing a drive in terms of partitioning and formatting, in accordance with one embodiment of the present invention. The method begins at an operation 202 where a drive connected to the system is selected to be prepared. As mentioned above, a system is capable of having several drives and it is important to select the correct drive for preparation to avoid preparing a drive having user data. Once the drive has been selected, the method proceeds to an operation 204 where the selected drive is partitioned.

In order to properly partition the drive, the user is required to provide information as to the desired size of each partition to be made on the drive. As is well known, the partitioning is generally performed by the computer's operating system partition function. The partitioning operation is generally called by an application requiring the drive preparation to be performed. Once the drive has been partitioned in operation 204, the method moves to an operation 206 where a kernel mode driver interface of the present invention is called by the application controlling the drive preparation operation.

The kernel mode driver interface is configured to create logical device control block (DCB) associations for each of the partitions of the drive. Once the logical DCBs have been created for each partition without the need for a rebooting operation, the method will proceed to an operation 208 where the partitions of the drive are formatted. In general, the drive preparation application will then call the operating system so that the appropriate formatting can be performed for each partition. Once the formatting is complete, the method will be done and the selected drive will be prepared and ready for use. It should be noted that the drive preparation flow is not interrupted with a reboot after the partitioning and another reboot after the formatting.

Figure 3A:
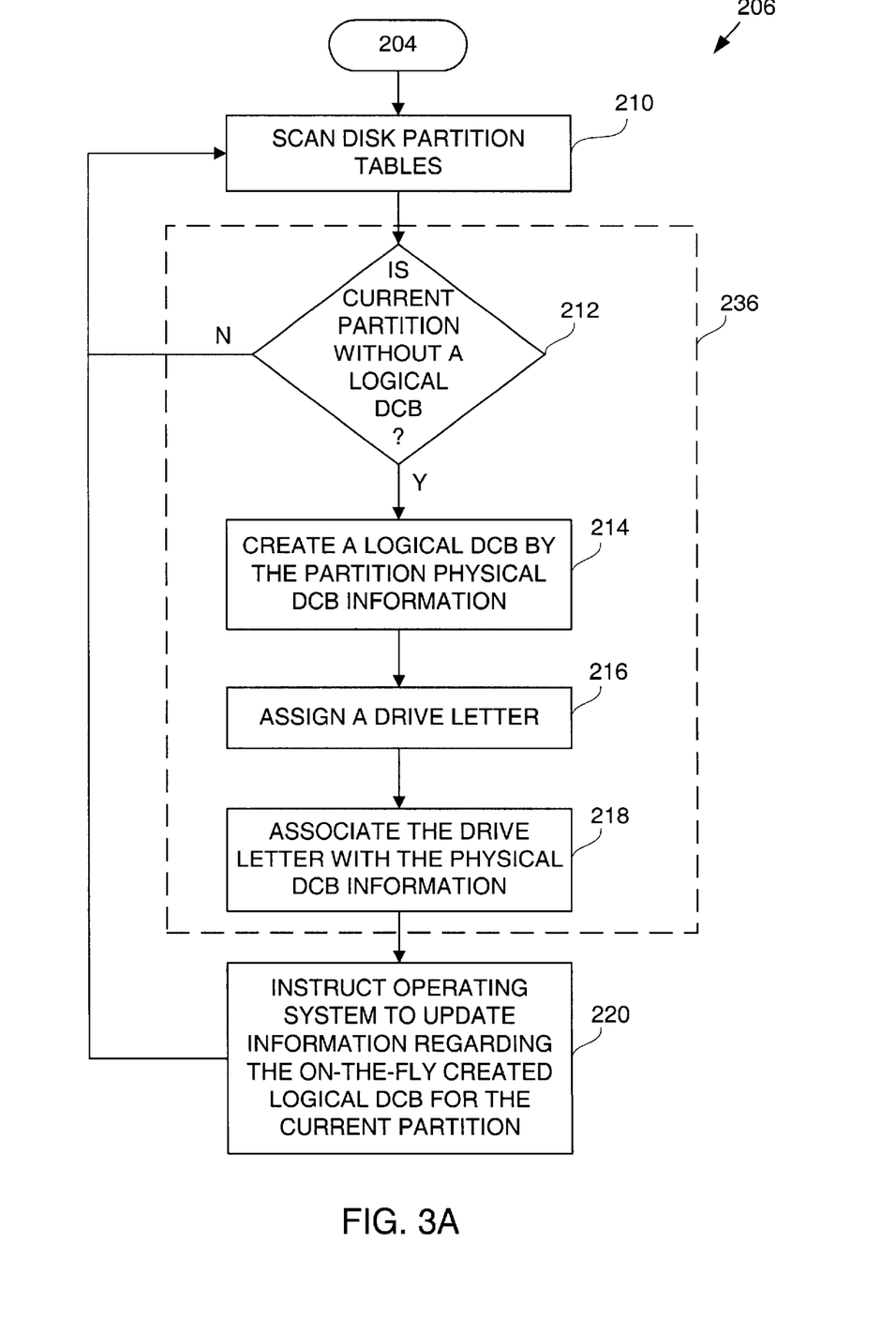
FIG. 3A shows a more detailed flowchart diagram of the method operations performed by the kernel mode driver interface when the logical DCBs are created on-the-fly for the partitions of the drive being prepared, in accordance with one embodiment of the present invention.

FIG. 3A shows a more detailed flowchart diagram of the method operations performed by the kernel mode driver interface when the logical DCBs are created on-the-fly for the partitions of the drive being prepared. Once the partitioning is complete in operation 204 of FIG. 2, the method proceeds to operation 206. Operation 206 is expanded to show the detailed method operations performed, beginning with operation 210 of FIG. 3A. In operation 210, the disk partition tables are scanned. As the scanning of the disk partition tables is performed, the method follows to an operation 236 where logical DCBs are created.

In more detail, the method proceeds from operation 210 to a decision operation 212. In decision operation 212, it is determined whether a current partition is without a logical DCB. If the current partition is not without a logical DCB, the method will proceed back to operation 210 where the disk partition tables are scanned again. If the next scanned partition is without a logical DCB, the method will proceed to an operation 214 where a logical DCB is created by the partitioned physical DCB information. At that point, the method proceeds to an operation 216 where a drive letter is assigned to the partition having the newly created logical DCB. After the drive letter has been assigned, the method advances to an operation 218 where the assigned drive letter is associated with well known physical DCB information.

Upon completing the association of the drive letter and the physical DCB information in operation 218, the method will proceed to operation 220 where the operating system is instructed to update information regarding the on-the-fly created logical DCB for the current partition. Next, the method will proceed back to operation 210 where the disk partition tables are scanned. This process will continue until all partitions that do not have a logical DCB have a logical DCB created by their associated partitioned physical DCB information.

Figure 3B:
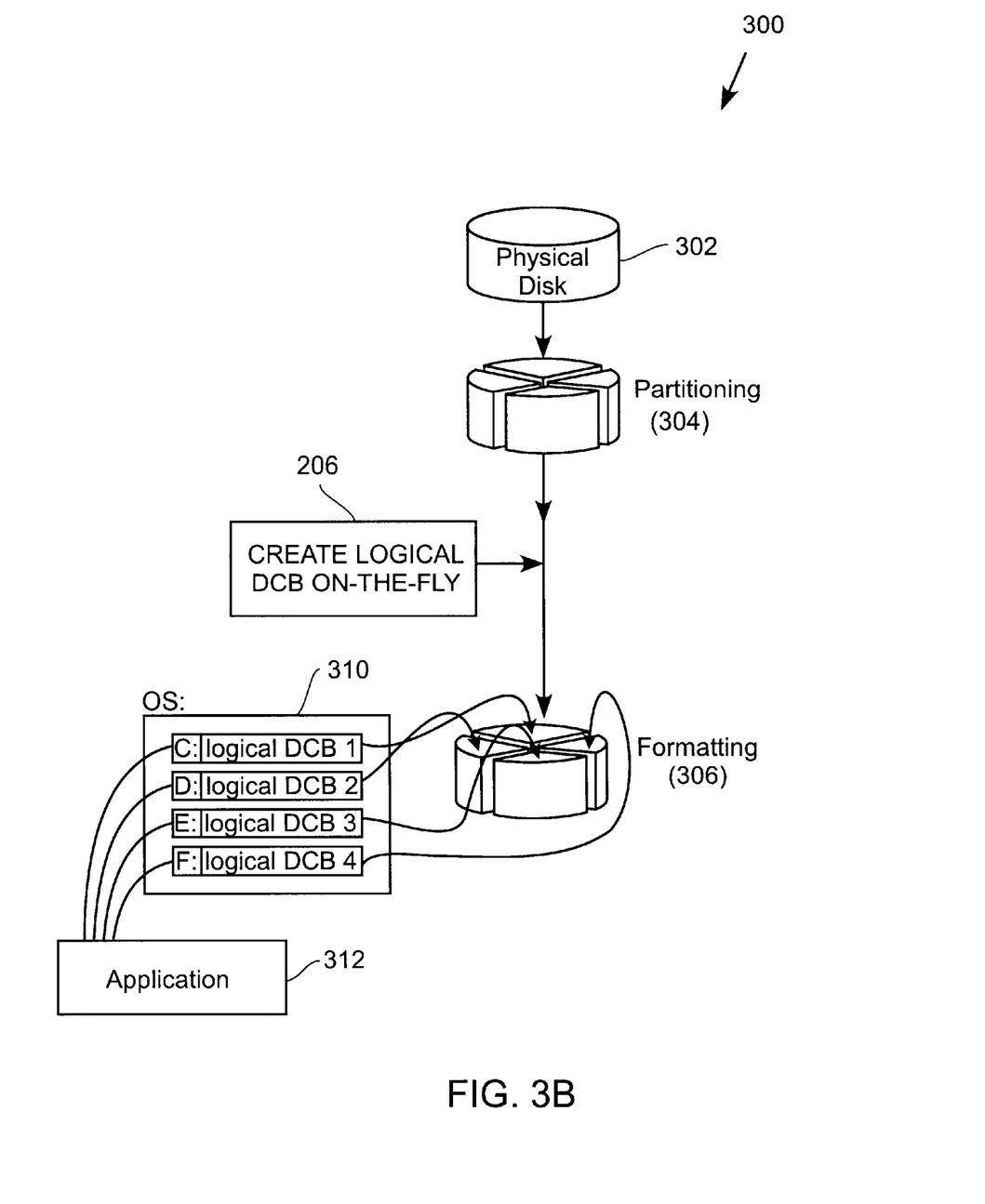
FIG. 3B shows a graphical representation of the preparation of a storage media of a physical disk, in accordance with one embodiment of the present invention.

FIG. 3B shows a graphical representation 300 of the preparation of a physical disk 302 in accordance with one embodiment of the present invention. In general, the physical disk 302 is first partitioned by the operating system in response to a request for partitioning by an application. Once the partitioning 304 is complete for the physical disk 302, the partitioned disk will be scanned to determine whether any of the partitions are without a logical DCB. If a particular partition or all partitions of the physical disk 302 are without a logical DCB, a logical DCB will be created on-the-fly 206 by the partitioned physical DCB information. In addition, a drive letter will be assigned to each partition and the drive letter will be associated to the physical DCB information. In this manner, the operating system 310 can update the system information regarding the partitions of the newly prepared disk.

Now, the physical disk 302 after being partitioned 304, will be formatted 306 (without a reboot). The application 312 will then be able to call upon any of the prepared partitions of the physical disk 302. At this point, any one of the partitions may serve as a storage medium for user data.

Figure 4A:
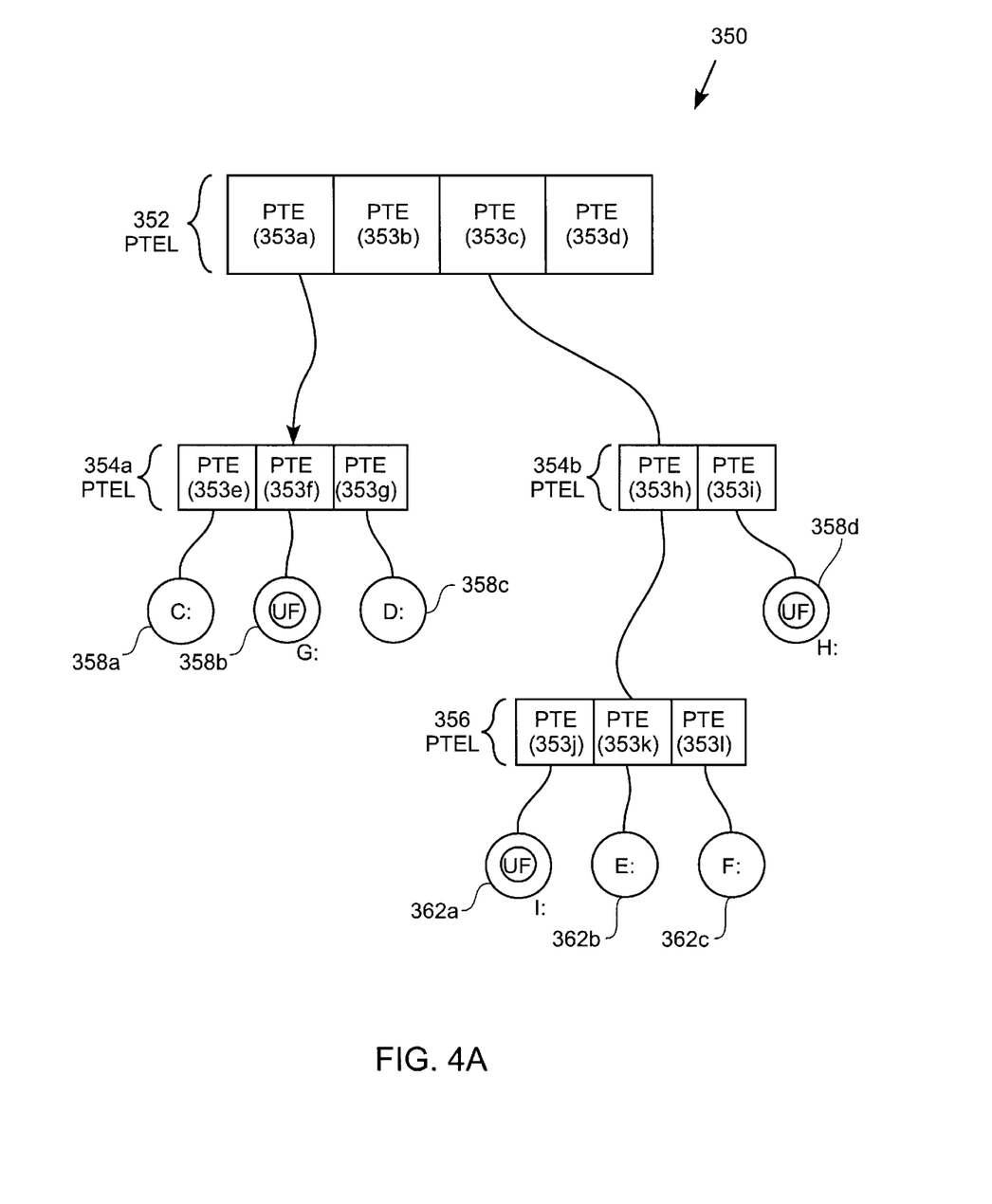
FIG. 4A illustrates a graphical representation of a partition table tree having partition table information.

FIG. 4A illustrates a graphical representation 350 of a partition table tree having partition table information. In general, the master boot record (MBR) will have the information associated with the partition table entries of various partition table entry lists. By way of example, a partition table entry list (PTEL) 352 may include four separate partition table entries (PTEs) 353a–353d, and each entry of the partition table entry list 352 may have an extended partition table entry list, such as partition table entry lists 354a and 354b.

Each of the partition table entries in the partition table entry lists 354a and 354b, may in turn have associated extended partition table entry lists. For instance, the partition table entry list 354b is shown having an extended partition table entry list 356. At a certain point down the tree of the partition table information, leafs 358a–358d and 362a–362c may be found. Each leaf therefore identifies a particular partition that may need a logical DCB. In this example, leafs 358a, 358c, 358b, and 362c have all been previously formatted and therefore already have a logical DCB. During the scanning described with reference to FIG. 3A, the leafs that have not been previously formatted are found during the scanning 210 (of FIG. 2) such that the logical DCBs can be created on-the-fly for those partitions. The leafs requiring the creation of a logical DCB will be, in this pictorial example, leafs 358b, 358d, and 362a, and will be assigned drive letters G:, H:, and I:, respectively.

Figure 4B:
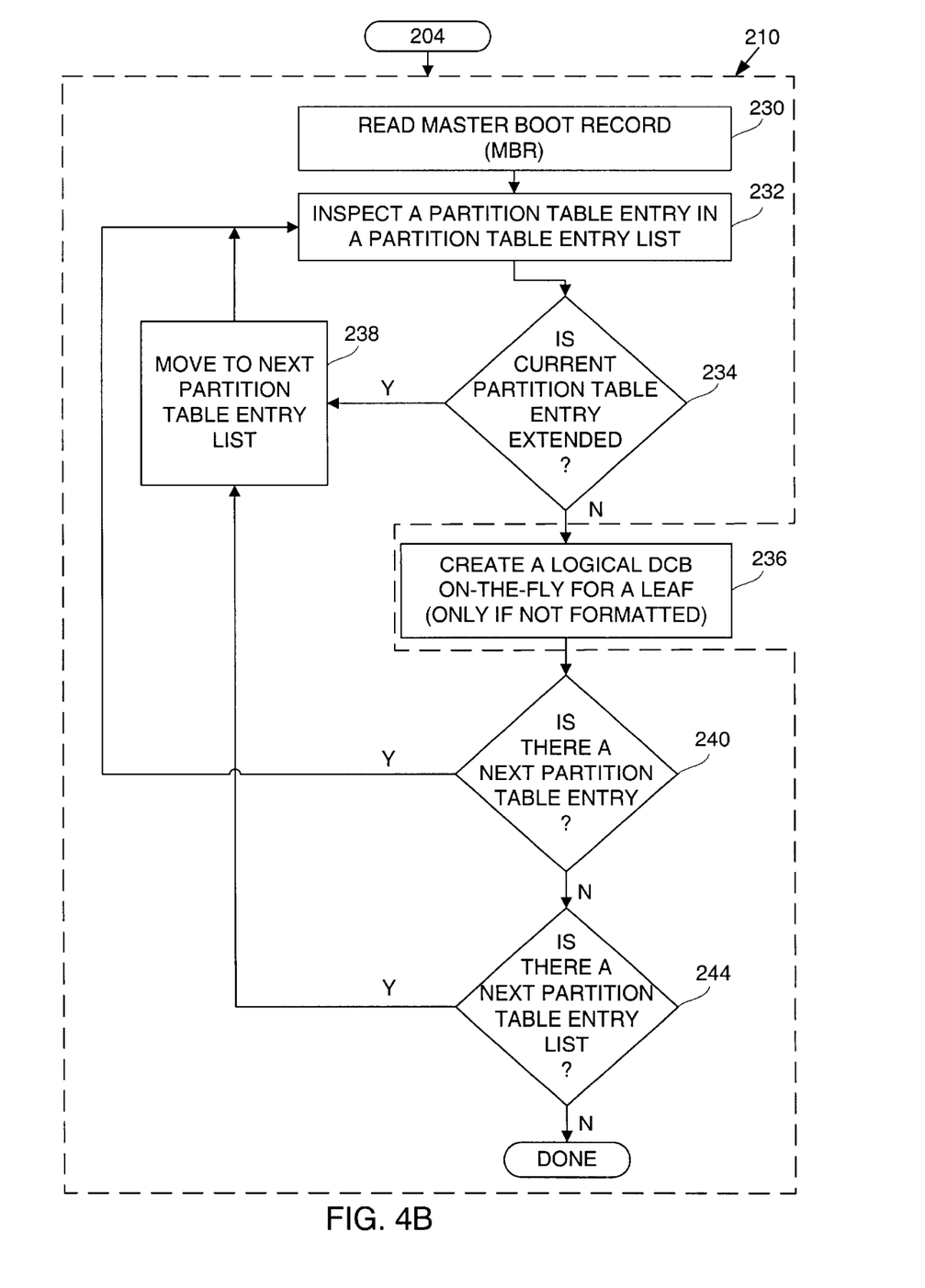
FIG. 4B illustrates in more detail the method operations performed during the scanning of the disk partition tables shown in operation 210 of FIG. 3A, in accordance with one embodiment of the present invention.

FIG. 4B illustrates in more detail the method operations performed during the scanning of the disk partition tables in operation 210 of FIG. 3A, in accordance with one embodiment of the present invention. Operation 210, as described in reference to FIG. 3A, is part of operation 206 and follows operation 204 illustrated in FIG. 2 in which the selected drive is partitioned. The scanning begins where the master boot record is read in operation 230. Upon reading the master boot record, the method will proceed to an operation 232 where a partition table entry in a partition table entry list is inspected. For instance, the first partition table entry list may be partition table entry list 352 of FIG. 4A.

The method now proceeds to a decision operation 234 where it is determined whether a current partition table entry is an extended partition table entry. In FIG. 4A, partition table entries 353a, 353c, and 353h are all extended partition table entries. By being an extended partition table entry, a sub-partition table entry list is provided down in the tree. If the current partition table entry is an extended partition table entry, the method will move from decision operation 234 to operation 238. In operation 238, the method will move to the next partition table entry list. In this operation, the method may move to partition table entry list 354a.

Now, the method will proceed back to operation 232 where a partition table entry in a partition table entry list is inspected. The method will again proceed to decision operation 234 until the current partition table entry is not an extended partition table entry. The method will then move to operation 236 (which is outside of operation 210) where a logical DCB is created on-the-fly for a leaf. As shown in FIG. 4A, a leaf that has not been formatted is marked UF (unformatted) such as, for example, leaf 358b. The method now moves to decision operation 240 where it is determined if there is a next partition table entry. If there is, the method will move to operation 232. On the other hand, if there is no next partition table entry, the method will move to operation 244 where it is determined whether there is a next partition table entry list. If there is, the method will move to the next partition table entry list in operation 238. The process will thus continue until all leafs from all partition table entry lists have been provided with logical DCBs. As mentioned above, because the DCBs are created on-the-fly, there is no need for the continual reboots that are necessary during conventional drive preparation operations.

With respect to the embodiments described above, it should be understood that the on-the-fly DCB creation provides computer users a very simple method for preparing a drive. Users that are not used to preparing new drives or preparing new partitions in used drives may now be guided by a preparation application that does not require the user to reboot the computer system after partitioning and then after formatting. Not only is the preparation flow prevented from being interrupted, users are less likely to remove the drive under preparation after the first reboot while being under the impression that the preparation has come to completion.

The invention employs various computer-implemented operations involving data stored in computer systems to drive computer peripheral devices. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The embodiments of the present invention are also useful in systems that require backup operations that protect a user's productivity. In such backup operations, the user may want to implement a secondary storage drive, which could preferably be prepared to embody an intelligent replica of the primary storage device. Thus, the preparation of such devices can benefit from the streamlined preparation operations of the present invention. For more information on such backup systems, reference can be made to a co-pending U.S. Patent Application having application Ser. No. 09/256,687, entitled "METHOD FOR MANAGING PRIMARY AND SECONDARY STORAGE DEVICES IN AN INTELLIGENT BACKUP AND RESTORING SYSTEM," and filed on Feb. 23, 1999. This application is hereby incorporated by reference herein.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for preparing a storage media, comprising:
    partitioning a selected storage media into two or more partitions;
    calling a kernel mode driver interface that is configured to create a logical device control block for each of the two or more partitions; and
    formatting each of the two or more partitions, the partitioning and formatting being performed on-the-fly without cycling through complete reboots after the partitioning and the formatting.

2. A method for preparing a storage media as recited in claim 1, wherein the creating of a logical device control block further comprises:
    scanning partition tables of the storage media;
    identifying partitions of the storage media that have not been previously formatted;
    associating a created logical device control block with physical device control block information of the identified partitions that have not been previously formatted;
    assigning a drive letter to each of the identified partitions that have not been previously formatted; and
    associating the assigned drive letters with the physical device control block information of the identified partitions that have not been previously formatted.

3. A method for preparing a storage media as recited in claim 2, wherein the creating of a logical device control block further comprises:
    instructing an operating system of a computer that is preparing the selected storage media to update information regarding the created logical device control blocks.

4. A method for preparing a storage media as recited in claim 2, wherein the scanning of the partition tables includes,
    reading a master boot record of the storage media, and the identifying of the partitions includes,
        inspecting each partition table entry list of the partition tables to identify the partitions of the storage media that have not previously been formatted.

5. A method for preparing a storage media as recited in claim 4, wherein the inspecting of each partition table entry list includes,
    determining whether a particular partition table entry of the partition table entry list defines an extended partition table entry list.

6. A method for preparing a storage media as recited in claim 2, wherein the storage media is one of a fixed hard drive and a removable media drive.

7. A method for partitioning and formatting storage media of a hard disk drive or removable disk drive, the method having a plurality of operations that are each called by a drive preparation application, the operations of the method comprising:
    partitioning the storage media into a plurality of partitions;
    creating a logical device control block for each of the plurality of partitions after the partitioning is complete; and
    formatting each of the plurality of partitions, the partitioning and formatting being performed on-the-fly without cycling through complete reboots after the partitioning and the formatting.

8. A method as recited in claim 7, wherein the creating of a logical device control block is performed by way of a kernel mode driver interface that gets called by the drive preparation application after the partitioning but before proceeding to the formatting.

9. A method as recited in claim 8, wherein the creating of a logical device control block further comprises:
    scanning partition tables of the storage media;
    identifying partitions of the storage media that have not been previously formatted; and
    associating a logical device control block with physical device control block information of the identified partitions that have not been previously formatted.

10. A method as recited in claim 9, wherein the creating of a logical device control block further comprises:
    assigning a drive letter to each of the partitions that have not been previously formatted; and
    associating the assigned drive letters with the physical device control block information of the partitions that have not been previously formatted.

11. A method as recited in claim 10, wherein the creating of a logical device control block further comprises:
    instructing an operating system of a computer that is preparing the selected storage media to update information regarding the created logical device control blocks.

12. A method as recited in claim 9, wherein the scanning of the partition tables includes,
    reading a master boot record of the storage media, and the identifying of the partitions includes,
        inspecting each partition table entry list of the partition tables to identify the partitions of the storage media that have not previously been formatted.

13. A method as recited in claim 12, wherein the inspecting of each partition table entry list includes,
    determining whether a particular partition table entry of the partition table entry list defines an extended partition table entry list.

14. A computer readable media having program instructions stored thereon for partitioning and formatting storage media of a hard disk drive or removable disk drive, the program instructions including a plurality of operations that are each called by a drive preparation application, the operations of the computer readable media comprising:

program instructions for partitioning the storage media into a plurality of partitions;

program instructions for creating a logical device control block for each of the plurality of partitions after the partitioning is complete; and program instructions for formatting each of the plurality of partitions, the partitioning and formatting being performed on-the-fly without cycling through complete reboots after the partitioning and the formatting.

15. A computer readable media as recited in claim 14, wherein the creating of a logical device control block is performed by way of a kernel mode driver interface that gets called by the drive preparation application after the partitioning but before proceeding to the formatting.

16. A computer readable media as recited in claim 15, wherein the program instructions for creating a logical device control block include:

program instructions for scanning partition tables of the storage media;

program instructions for identifying partitions of the storage media that have not been previously formatted; and program instructions for associating a logical device control block with physical device control block information of the identified partitions that have not been previously formatted.

17. A computer readable media as recited in claim 16, wherein the program instructions for creating a logical device control block further include:

program instructions for assigning a drive letter to each of the partitions that have not been previously formatted; and program instructions for associating the assigned drive letters with the physical device control block information of the partitions that have not been previously formatted.

18. A computer readable media as recited in claim 17, wherein the program instructions for creating a logical device control block further include:

program instructions for instructing an operating system of a computer that is preparing the selected storage media to update information regarding the created logical device control blocks.

19. A computer readable media as recited in claim 18, wherein the program instructions for scanning the partition tables include, program instructions for reading a master boot record of the storage media, and the program instructions for identifying the partitions include, program instructions for inspecting each partition table entry list of the partition tables to identify the partitions of the storage media that have not previously been formatted.

20. A computer readable media as recited in claim 19, wherein the program instructions for inspecting each partition table entry list include:

program instructions for determining whether a particular partition table entry of the partition table entry list defines an extended partition table entry list.

* * * * *